United States Patent Office 3,347,684
Patented Oct. 17, 1967

3,347,684
DECORATIVE FIRE RETARDANT PAINTS
Noel D. Blair, Tonawanda, and Joseph A. Pawlak, Cheektowaga, Buffalo, N.Y., assignors to Hooker Chemical Corporation, Niagara Falls, N.Y., a corporation of New York
No drawing. Filed Sept. 13, 1963, Ser. No. 308,687
12 Claims. (Cl. 106—15)

This invention relates to fire retardant paints primarily useful as a protective and decorative coating for use over a wide variety of substrates, but latently or inherently fire retardant in nature after deposition in thin films on a surface and upon exposure of the deposited film to the atmosphere.

Fire retardant paints are not new. The prior art includes references to fireproofing compositions and fire retardant compositions which may be applied in paint form and which are said to be useful in retarding fire and flame spread. The composition of the present invention provides a coating which is not only superior in its fire retardant qualities when exposed to flame, but also provides a coating of value as such for its protective and decorative qualities prior to being subjected to fire. Heretofore the prior art fire retardant paints have left much to be desired in their applicability to surfaces. Most have little or no flow quality and hence do not provide the necessary smoothness of film to qualify for the usual protective and decorating coating jobs, for example, applications to interior walls of a residential building. Also, some of the prior art compositions having effective fire retardant quality are of the two package type. To prepare such products for application to the wall, the ultimate consumer has to mix a liquid with a dry stock to make the liquid paint product. Often the fire retardant paints of the prior art, when held mixed together for more than 16 to 48 hours, would gel or solidify in the package and increase in viscosity to such an extent that application by roller coater, brush, spray, dipping or other conventional means of application became impossible.

Another serious limitation of many prior art fire retardant compositions is in their lack of washability. In general, most of the prior art compositions which provided an intumescent film upon exposure to flame, not only lacked the necessary smoothness to be acceptable for decorative effect, but were inadequate in durability. Upon exposure to washing, as for example in removing of spots or in periodic cleaning with soap and water, the film were solubilized in aqueous washing media and were removed from the wall. In many cases where removal did not occur, most often, the latent intumescent quality of the coating was dissipated with the first washing.

Most fundamentally, however, the prior art fire retardant paint products were less effective than desired in providing a resistance to flame and an insulating coating between the sources of flame and combustible building materials within a building structure.

As is well known among those which are concerned with the problem of preventing economic loss due to fires, the events of the first few minutes after outbreak of a fire are extremely important with respect to the overall economic loss. If the ravaging quality of a fire can be delayed for longer periods of time so that the fire-fighting equipment may be on the scene before the fire has spread widely, the losses of property are materially reduced.

With the limitations of the prior art fire retardant compositions in mind, it is the primary object of this invention to provide a coating composition of conventional solvent reduced character having application characteristics of high quality organic solvent reducible wall paint.

It is an additional object of this invention to provide mixed protective and decorative coating composition which has latent fire retardant quality due to the ability of the deposited film to expand and provide an insulating layer between the flame source and the building wall, as well as to provide a quantity of liberated products of decomposition which are primarily non-combustible and which tend to extinguish the flame.

It is still a further object of the invention to provide a protective decorative coating having a pleasing appearance to the eye when applied to a wall surface and having the character of reducing heat transfer in its intumescent state during partial decomposition, caused by exposure to flame.

Yet another object of this invention is to provide a novel paint composition which, when exposed to flame, will generate an intumescent insulating layer and at the same time generate gases of a low order of toxicity upon flame decomposition and destructive distillation of the paint film.

These and other objects of the invention will become apparent as the description of the invention and the examples illustrative of the invention are more fully developed in the specification.

In accordance with this invention there is provided a decorative fire retardant paint comprised of a volatile vehicle component, a non-volatile vehicle component, an inert pigment and a fire retarding pigment derived from hexachlorocyclopentadiene, which may be selected from the group consisting of (a) bis(pentachlorocyclopentadienyl), (b) 2,2′,3,3′,4,4′,5,5′,7,7,7′,7′-dodecachloro-1,1′,2,2′,5,5′6,6′-octahydro-2,2′,5,5′-methanobiphenyl, (c) compounds having the formula

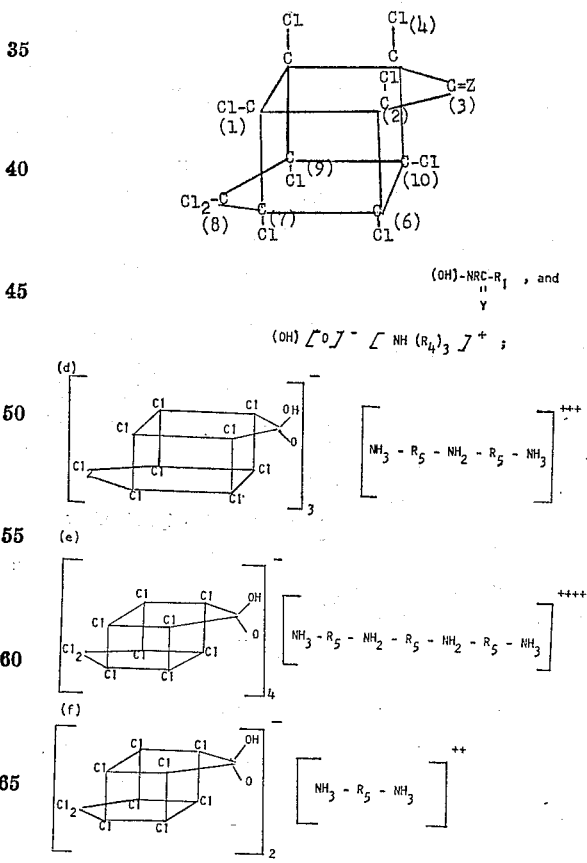

and (g) mixtures thereof.

R is selected from the group consisting of hydrogen, alkyl, substituted alkyl, aryl and substituted aryl. $R_1$ is selected from the group consisting of hydrogen, alkyl, substituted alkyl, aryl, substituted aryl, amino, substituted amino, alkoxy, and aryl alkoxy. Y is selected from the group consisting of O and S, $R_2$ and $R_3$ are selected from the group consisting of H; alkyl; substituted alkyl, in which the substituents are defined as halogen, alkyl, alkoxy, aryloxy, furyl, tetrahydrofuryl, alkylmercapto, arylmercapto, and alkenyl groups; aryl; substituted aryl in which the substituents are defined as halogen, alkyl, alkoxy, aryloxy, furyl, tetrahydrofuryl, alkylmercapto, arylmercapto, and alkenyl groups; $R_2$ and $R_3$, conjoined, defined as alkylene and substituted alkylene in which the substituents are defined as halogen, alkyl, nitro, alkyloxy, aryloxy, furyl, tetrahydrofuryl, alkylmercapto, arylmercapto and alkenyl groups; phenylene and substituted phenylene in which the substituents are defined as halogen, alkyl, nitro, alkoxy, aryloxy, furyl, tetrahydrofuryl, alkylmercapto, arylmercapto and alkenyl groups. Each $R_4$ expression is independently selected from the group consisting of hydrogen, alkyl and monohydroxyalkyl. Each $R_5$ expression is an alkylene group having from 2 to 6 carbon atoms. $x$ is an integer from zero to 5.

The fire retardant pigments of this invention are condensation products of hexachlorocyclopentadiene wherein 2 moles of hexachlorocyclopentadiene are condensed either with one mole of a diene or with itself and are subsequently reacted with suitable reactants to yield the desired side chain structure. The former type of compound may be properly characterized as a Diels-Alder adduct product.

The preparation of 2,2′,3,3′,4,4′,5,5′,7,7,7′,7′-dodecachloro-1,1′,2,2′,5,5′,6,6′ - octahydro - 2,2′,5,5′,6,6′-octahydro-2,2′,5,5′-methanobiphenyl is disclosed in U.S. Patent 2,606,910 issued Aug. 12, 1952. For convenience this compound will be referred to by its empirical formula ($C_{14}H_6Cl_{12}$). $C_{14}H_6Cl_{12}$ is prepared by condensing two moles of hexachlorocyclopentadiene with one mole of 1,3-butadiene at a temperature below 200 degrees centigrade and thereafter recrystallizing the reaction product from isopropyl alcohol. This compound melts at about 232 degrees centigrade.

The compound bis(pentachlorocyclopentadienyl) (short title $C_{10}Cl_{10}$) is prepared by the dechlorination of hexachlorocyclopentadiene. Methods for the preparation of $C_{10}Cl_{10}$ are disclosed in U.S. Patent 2,732,409, issued on Oct. 30, 1952 to Albert C. Ladd, and in an article published in the Journal of American Chemical Society, vol. 77, pp. 4375 to 4378, 1955, entitled Chemistry Hexachlorocyclopentadiene III, Synthesis of Bis(pentachlorocyclopentadienyl) and Related Compounds, by E. T. McBee, J. D. Idol, Jr., and C. W. Roberts.

Since the balance of the fire retardant pigments of this invention may be considered as derivatives of the previously described pentacyclo structure, nomenclature difficulties may be avoided by referring to this parent structure (see below) as $C_{10}Cl_{10}$:

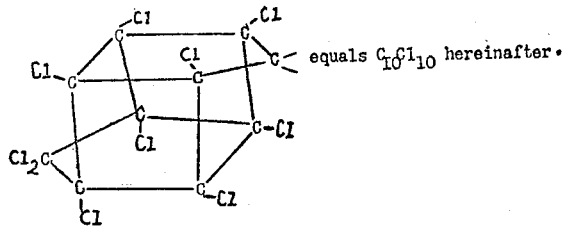

While this structure is believed to be correct, what we mean to describe in our invention are decorative fire retardant paints containing fire retardant pigments made as described herein, regardless of structure. It is noted that the literature regarding this basic structure has made some shifts in the nomenclature for this type of compound (note articles by McBee et al., Journal American Chem. Soc., vol. 78, p. 1511, 1956; Ungade and McBee, Chem. Reviews, vol. 58, p. 282, 1958 and Eaton et al., Journal Organic Chemistry, vol. 25, p. 1225, 1960).

$C_{10}H_2O_3SCl_{12}$ is prepared by reacting hexachlorocyclopentadiene with chlorosulfonic acid at a temperature within the range of 30 to 170 degrees centigrade as disclosed in U.S. Patent 2,516,404. The exact structure of this compound has not been stated in the literature. The reaction product is characterized by a melting point of about 146 degrees centigrade.

The ketone known presently as decachlorooctahydro-1,3,4-metheno-2H-cyclobuta[cd]-pentalene-2 - one (short title $C_{10}Cl_{10}O$), whose preparation is described in U.S. Patent 2,616,928 (Re. 24,435) and 2,616,825 (Re. 24,749), may be hydrolyzed with water to yield the monohydrate wherein the Z term is $(OH)_2$, to form the dihydrate wherein the Z term is $(OH)_2 \cdot H_2O$ or the polyhydrate wherein the Z term is $(OH)_2 \cdot xH_2O$.

The amide fire retarding pigments of this invention wherein the Z term of the generic formula is $$(OH)-NR\underset{Y}{\overset{\|}{C}}-R_1$$

are prepared by heating the above described $C_{10}H_2O_3SCl_{12}$ in an appropriate solvent with at least one molar equivalent of an amide or thioamide of the structure $NHRC(=Y)R_1$. The amide may be added at the beginning of the heating, gradually during the heating or after the heating has commenced for several hours. The rate and order of addition are not critical features. It is not necessary to use a solvent for the reaction when the amide is a liquid or low melting solid, but where the amide is not easily fused, a solvent is convenient. Appropriate solvents include, among others, chlorinated hydrocarbons, such as chlorobenzene, acetylene tetrachloride; aliphatic and aromatic compounds, such as cyclohexane, xylene or toluene; ketones, such as methylethyl and methylpropyl ketone, ethers such as diethyl, dipropyl, isobutyl ethers; nitrohydrocarbons, such as nitrobenzenes; esters, such as the lower alkyl acetates; and acids, such as formic acid. Where the amide is a liquid, solvent may be dispersed with, using an excess of the amide instead. The temperatures needed to initiate and continue the reaction are not critical and vary considerably according to the reactions used, but usual useful ranges have been found to be about zero to about 200 degrees centigrade, with a satisfactory range generally being between about 20 degrees and 175 degrees centigrade. Similarly, the time for the reaction to become complete, as measured by infrared analysis, varies according to several factors such as temperature of the reactants. Many reactions are completed in less than an hour, but others may take as long as a day. The reaction may also be followed by checking the rate of $SO_2$ which is evolved, the reaction being halted when the flow of $SO_2$ has essentially ceased. It is desirable that the amides employed as fire retarding pigments have a melting point of above 70 degrees centigrade and preferably above 80 degrees centigrade.

The amides, as defined above, include the following compounds, $C_{10}Cl_{10}(OH)-NH-CHO$ $C_{10}Cl_{10}(OH)-NH-COCH_3$ $C_{10}Cl_{10}(OH)-NH-COCH_2CH_3$ $C_{10}Cl_{10}(OH)-NH-COCH-CH_2$ $C_{10}Cl_{10}(OH)-NH-COC_{17}H_{35}$ $C_{10}Cl_{10}(OH)-NH-COCH_2Cl$ $C_{10}Cl_{10}(OH)-NHCOCHOHCH_3$ $C_{10}Cl_{10}(OH)-NH-COCCl_3$ $C_{10}Cl_{10}(OH)NHCOCH_2CH_2CH_2CH_2CONH(C_{10}Cl_{10}(OH))$ $C_{10}Cl_{10}(OH)-NH-CO-$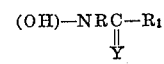

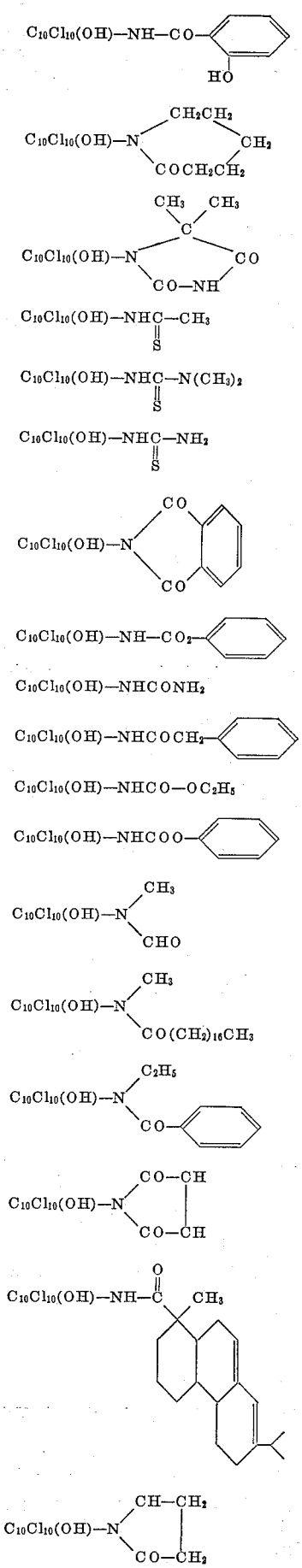

Amine salts of the type exemplified by the following formulas $$[C_{10}Cl_{10}(OH)O]^-[NH(R_4)_3]^+$$
$$[C_{10}Cl_{10}(OH)O]_2^-[NH_3-R_5-NH_3]^{++}$$
$$[C_{10}Cl_{10}(OH)O]_3^-[NH_3-R_5-NH_2-R_5-NH_3]^{+++}$$

and $$[C_{10}Cl_{10}(OH)O]_4^-[NH_3-R_5-NH_2-R_5-NH_2-R_5-NH_3]^{++++}$$

are suitable fire retarding pigments in the paints of this invention. These amine salts are readily prepared by reacting, e.g., by reflux, the $C_{10}Cl_{10}$ hydrates with the desired amine in a suitable solvent for a period of time at moderate temperatures. Suitable amines include both aromatic and aliphatic amines whether primary, secondary or tertiary. Suitable amines include triethanolamine, ethylenepentamine, diethylamine, diethylene triamine, tetraethylenediamine, hexamethylenetetramine, butylamine, morpholine, pyridine, and aminophenylamine. Useful solvents for the preparation of these salts include the polar solvents such as the ketones, such as the lower ketones, e.g., acetone.

In the foregoing description of the fire retarding pigments of this invention the terms alkyl and aryl unless otherwise qualified are useful as defined below. Alkyl groups contain from 1 to 20 carbon atoms and the preferred alkyls are the lower alkyls having from 1 to 6 carbon atoms. Aryl as used in this invention is to be understood to include aromatic compounds having from 6 to 18 carbon atoms. The most preferred aryl is phenyl.

The invented paints are also useful in preparing prepainted combustible products. These products include plywood, fiber boards, press (or composition) boards of all types, metal containers and lumber of all sizes. The prepainted products are usually mechanically painted by machines using spray or brush means of application. The paint is applied at a constant rate and allowed to dry between successive coats of point. One coat being sufficient for priming while 2 or more coats are applied to achieve aesthetic or fire retardant qualities sought. The prepainted article is then ready for conversion to the finished product without further painting. Products thus prepared include construction and home furnishings such as wall panels, moulding, trim boards, furniture, shingles and picture frames.

The fire retardant pigments of this invention offer advantages over fire retarding agents employed in paint by the prior art, namely, insensitivity to water and second these materials are true substitutes for previously used pigments in paints and are not merely additional additives to be overcome by the tinting power of the balance of the paint pigments. While in some cases it may be desirable to substitute the fire retarding pigments of this invention for the entire pigment volume of the paint under consideration, generally only from about 20 to about 80 percent of the pigment will be substituted by retardant pigments of this invention. Especially useful and decorative paints are prepared when the fire retarding pigments of this invention are substituted for the so-called filler or low covering power pigments of the paint. Very effective decorative fire retarding paints are prepared when from about 30 to about 70 percent of the total pigment is substituted, emphasis being placed on the substitution of the fire retarding pigments for the filler pigment of the paint so that the tint strength remains unchanged.

The balance of the pigmentation of the paints of this invention is to a considerable measure pigments known in the paint formulating art and the kinds and qualities of the pigments employed may vary although it has been found that excellent results are obtained when using titanium dioxide or a mixture of titanium dioxide and zinc oxide as a fine pigment in conjunction with the flame retarding pigments of the invention. The ratio of pigment to vehicle may vary over a range of about 30:70 to about 80:20, with the pigment being kept wettable by the particular vehicle system. See Organic Coating Technology, volume II, by H. Payne, J. Wiley & Sons, New York, 1961.

Paint vehicles are conventionally divided into two major groups, (1) oil based and (2) latex based. Embraced within the oil based group are those vehicles such as linseed oil, oleoresins, alkyds and the recently developed linseed oil derivatives which are capable of being thinned by the addition of water. A commercial product of this last vehicle type is "Linaqua" manufactured by Spencer-Kellogg Co., Buffalo, New York. The foregoing vehicles are considered non-volatile. Volatile vehicles or thinners for use with the non-volatile oil type vehicles include but are not limited to turpentine, naphtha, trichloroethylene, perchloroethylene and mineral spirits. Latices for paint vehicle use are generally based on polyvinylalcohol and acetate polymers, styrene-butadiene copolymers and polyacrylic polymers. The various latices contain and are thinned by water which acts as the volatile portion of a latex vehicle.

The paints of this invention may be prepared in a conventional manner on suitable jar and paint mills by mixing sufficient vehicle with the entire pigment portion and dryer system to make a paste of the correct consistency for grinding, after which the desired dispersion or grind is then thinned down with the remainder of the vehicle and the formulation.

Invented paints were applied to ¼ x 8 x 12 inch yellow poplar panels by brushing. Two coats were applied to each test panel, for a total coverage of approximately 125 sq. ft. per gallon, obtaining as uniform coverage as possible. Backs, edges and sides were also well coated with the same material. A drying period of approximately 1 week at room temperature was allowed between coats while an additional period of two weeks was allowed after the second coat. Prior to the burning test, the panels were placed in an oven at about 120 degrees Fahrenheit for a period of 40 hours. Other panels were aged exposed to sun and weather for 1 year after painting and were then tested.

The flame tests were carried out on the test panels using the methods specified in American Society for Testing Materials Procedure D–1360–58, "Fire Retardancy of Paints," Method C. Testing was performed in a sheet metal test shield having inside dimensions, 12″ in width by 12 inches in depth by 30 inches in heigth and fitted with a smoke stack at the top. The shield has a viewing window in one side of sufficient size and in such a position that specimens under tests may be observed. This viewing side is hinged so that the shield may be readily opened and closed to facilitate the mounting and the ignition of the test specimens. The test specimens were mounted on a suitable support, test face down, forming a 45 degree angle with the vertical. The flame source was absolute ethyl alcohol contained in a brass cup supported on a cork insulated metal pedestal so positioned that the vertical ditsance from the cup lip nearest the panel base was exactly 1 inch. The cup was set to be equal distances from the panel sides. It was of an outside diameter of 15/16 inch with an outside height of 11/16 inch and a volume of 6 milliliters. Prior to testing, each panel was weighed to the nearest 0.1 gram. Uusing a pipette, 5 ml. of alcohol was added to the cup and ignited without delay by means of a Bunsen burner flame ½ inch in height. The test was allowed to continue until all the flames were self extinguished. Test panels were then allowed to cool to room temperature and weight losses were determined. Char areas were measured and char volume was determined by measuring the depth of the char, as evidenced by the longitudinal and lateral cuts, and multiplying this by the char area. The procedure was then repeated on at least four replicate panels.

The practice of this invention is illustrated by but not limited to the examples given below which describe certain preferred forms thereof. All formulations are expressed pounds.

The use of varying amounts of $C_{14}H_6Cl_{12}$ in an exterior linseed oil paint is illustrated in Table I, comprising Examples 1–4. As will be noted, the weight loss and char volume are very low in Example 4, in contrast to those of Example 15, which is attributable to the very good intumescent action noted in the first mentioned experiment.

TABLE I.—FIRE RETARDANT PAINTS WITH $C_{14}H_6Cl_{12}$

| Example | 1 | 2 | 3 | 4 |
|---|---|---|---|---|
| Pigment: | | | | |
| Titanium Dioxide | 200 | 200 | 200 | 200 |
| Zinc Oxide, Leaded, 35% | 401 | 330 | 260 | 220 |
| Magnesium Silicate | 251 | 180 | 110 | 70 |
| $C_{14}H_6Cl_{12}$ | | 142 | 282 | 362 |
| Vehicle: | | | | |
| Heat Bodied Linseed Oil (Z–2 Viscosity) | 142.4 | 172.6 | 201.6 | 218.1 |
| Raw Linseed Oil | 230.3 | 320.5 | 374.4 | 405.2 |
| Mineral Spirits | 153.8 | 143.8 | 130 | 81.3 |
| 24% Lead Naphthenate, 24% | 6.2 | 8.2 | 9.6 | 10.4 |
| 6% Manganese Naphthenate, 6% | 1.7 | 2.5 | 2.9 | 3.1 |
| Total | 1,386.4 | 1,529.6 | 1,570.5 | 1,570.1 |
| Pigment Volume Concentration | 32.0 | 32.0 | 32.0 | 32.0 |
| $C_{14}H_6Cl_{12}$, percent (volume) of pigment | | 32.1 | 54.6 | 64.7 |
| Viscosity, Brookfield, poises, #4 spindle, 60 r.p.m | 12.3 | 13.0 | 11.5 | 13.2 |
| Flame Test: | | | | |
| Average Weight Loss, gram | 12.9 | 7.7 | 5.9 | 4.7 |
| Average Char Area, square inches | 20.7 | 14.8 | 14.5 | 18.9 |
| Average Char Volume, cubic inches | 3.25 | 1.97 | 1.13 | 0.57 |

Comparable fire retardancy is obtained when the paints of Examples 2–4 are applied to other combustible materials such as plywood, fiber board and other building materials, particularly those of a vegetable origin.

Exterior linseed oil paints containing $C_{10}Cl_{10}O$-hydrates are illustrated in Table II. The preparation of suitable hydrates according to this invention is exemplified in Example 18 below. Satisfactory intumescence was obtained from the paints of Examples 5–8.

TABLE II.—FIRE RETARDANT PAINTS WITH $C_{10}Cl_{10}O$ HYDRATES

| Example | 5 | 6 | 7 | 8 |
|---|---|---|---|---|
| Pigment: | | | | |
| Titanium Dioxide | 200 | 200 | 200 | 200 |
| Zinc Oxide, Leaded, 35% | 260 | 220 | 180 | 330 |
| Magnesium Silicate | 110 | 70 | 30 | 180 |
| $C_{10}Cl_{10}O$ Hydrate (See Ex. 18) | 282 | 362 | 442 | 142 |
| Vehicle: | | | | |
| Heat Bodied Linseed Oil (Z-2 viscosity) | 203.2 | 220 | 237.2 | 173.4 |
| Raw Linseed Oil | 377.5 | 409.3 | 440.6 | 322.1 |
| Mineral Spirits | 183.7 | 184.2 | 182.5 | 180 |
| Lead Naphthenate, 24% | 9.7 | 10.5 | 11.3 | 8.3 |
| Manganese Naphthenate, 6% | 2.9 | 3.2 | 3.4 | 2.5 |
| Total | 1,629.0 | 1,679.2 | 1,727.0 | 1,538.3 |
| Pigment Volume Concentration | 32.0 | 32.0 | 32.0 | 32.0 |
| Fire Retardant, percent (volume) of pigment | 54.9 | 65.0 | 73.7 | 32.4 |
| Viscosity, Brookfield, poises, #4 spindle, 60 r.p.m | 13.3 | 13.4 | 13.7 | |
| Flame Test: | | | | |
| Average Weight Loss, gram | 8.0 | 9.2 | 10.0 | 10.0 |
| Average Char Area, square inches | 18.4 | 21.8 | 24.4 | 17.5 |
| Average Char Volume, cubic inches | 2.45 | 3.0 | 3.7 | 2.6 |

The amine salts of this invention are described in Table III. This table shows the testing or $C_{10}Cl_{10}O$-triethanolamine salts in a decorative exterior linseed oil paint formulation. Preparation of the amine salts is given in Example 19 below. In addition to being decorative and fire-retardant these paint formulations showed satisfactory intumescent properties.

TABLE III.—FIRE RETARDANT PAINTS WITH $C_{10}Cl_{10}O$-TRIETHANOLAMINE SALTS

| Example | 9 | 10 | 11 | 12 | 13 |
|---|---|---|---|---|---|
| Pigment: | | | | | |
| Titanium Dioxide | 200 | 200 | 200 | 200 | 200 |
| Zinc Oxide, Leaded, 35% | 330 | 330 | 360 | 220 | 180 |
| Magnesium Silicate | 180 | 180 | 110 | 70 | 30 |
| $C_{10}Cl_{10}O$-Triethanolamine salt (See Ex. 19) | 142 | 142 | 282 | 362 | 442 |
| Vehicle: | | | | | |
| Heat Bodied Linseed Oil (Z-2 viscosity) | 176.3 | 175.5 | 197.4 | 212.8 | 228.2 |
| Raw Linseed Oil | 284.6 | 317.0 | 366.8 | 395.3 | 424.0 |
| Mineral Spirits | 93.8 | 102.5 | 100.0 | 175.0 | 177.5 |
| Lead Naphthenate, 24% | 7.7 | 8.1 | 9.4 | 10.1 | 10.9 |
| Manganese Naphthenate, 6% | 2.3 | 2.4 | 2.8 | 3.0 | 3.3 |
| Total | 1,416.7 | 1,457.5 | 1,528.4 | 1,648.2 | 1,675.9 |
| Pigment Volume Concentration | 32.0 | 32.2 | 32.0 | 32.0 | 32.0 |
| Fire Retardant, percent (vol.) of pigment | 33.5 | 31.2 | 53.6 | 63.8 | 72.7 |
| Viscosity, Brookfield, poises, #4 spindle, 60 r.p.m. | 13.2 | | 12.9 | 12.9 | 13.0 |
| Flame Test: | | | | | |
| Average Weight Loss, grams | 8.9 | 7.5 | 6.3 | 9.4 | 8.4 |
| Average Char area, square in | 20.1 | 13.3 | 19.7 | 24.4 | 23.1 |
| Average Char Volume, cubic in | 2.50 | 1.64 | 2.5 | 3.2 | 3.54 |

This table is illustrative of results obtainable when other amine salts of the formulas discussed above are employed in place of the triethanolamine salt.

Table IV illustrates the use of various other $C_{10}Cl_{10}OH$ based compounds in decorative fire retardant linseed oil paints. Preparation of the glycerol derivative is shown in Example 20 below. The ethylenediamine derivative is shown in Example 21. Intumescence was also obtained from these paints.

TABLE IV.—FIRE RETARDANT PAINTS—$C_{10}Cl_{10}O$ ADDUCTS

| Example | 1 | 14 | 15 | 16 | 17 |
|---|---|---|---|---|---|
| Pigment: | | | | | |
| Titanium Dioxide | 200 | 200 | 200 | 200 | 200 |
| Zinc Oxide, Leaded, 35% | 401 | 330 | 330 | 330 | 330 |
| Magnesium Silicate | 251 | 180 | 180 | 180 | 180 |
| $C_{10}H_2O_3SCl_{12}$ | | | 142 | | |
| $C_{10}Cl_{10}O$-Ethylene Diamine (See Ex. 21) | | | | 142 | |
| $C_{10}Cl_{10}$ | | | | | 142 |
| $C_{10}Cl_{10}O$-ethylene glycol (Ex. 20) | | | | | 142 |
| Vehicle: | | | | | |
| Heat Bodied Linseed Oil (Z-2 viscosity) | 142.4 | 139.6 | 170.0 | 170.6 | 175.0 |
| Raw Linseed Oil | 230.3 | 225.3 | 274.3 | 271.5 | 282.3 |
| Mineral Spirits | 158.3 | 75.0 | 81.3 | 92.5 | 87.5 |
| Lead Naphthenate, 24% | 6.2 | 6.1 | 7.4 | 7.4 | 7.6 |
| Manganese Naphthenate, 6% | 1.7 | 1.8 | 2.2 | 2.2 | 2.3 |
| Total | 1,386.4 | 1,299.8 | 1,387.2 | 1,396.2 | 1,406.7 |
| Pigment Volume Content | 32.0 | 32.0 | 32.0 | 32.0 | 32.0 |
| Fire Retardant, percent (volume) of pigment | | 28.4 | 31.1 | 30.3 | 33.0 |
| Viscosity, Brookfield, poises #4 spindle, 60 r.p.m. | 12.3 | 13.0 | 12.3 | 13.0 | 11.5 |
| Flame Test: | | | | | |
| Average Weight Loss, gram | 12.9 | 8.1 | 9.8 | 9.5 | 10.5 |
| Average Char Area, square in | 20.7 | 21.5 | 25.5 | 28.3 | 24.0 |
| Average Char Volume, cubic in | 3.25 | 3.5 | 3.39 | 3.76 | 3.44 |

As previously noted, many of the fire retardant paints contained water soluble fire retarding agents which were soon leached out. Table V below is illustrative of the water insolubility of the fire retarding agents of this invention. Additional poplar test panels were coated in the standard method with the fire retardant paint containing varying amounts of $C_{14}H_6Cl_{12}$. After being completely dried in the manner of the other test panels of this invention, these panels were then immersed in water at approximately 72 degrees Fahrenheit for a period of 30 days. At the end of this time, the panels were removed and conditioned for 4 days at room temperature and 40 hours at 50 degrees centigrade. The panels were then burned in accordance with the previously described method. In each case the linseed paint formulations had a pigment vehicle content of 32 percent. Example 1 contained no fire retarding agent.

TABLE V.—WATER LEACHED FIRE RETARDANT PAINT

Paint of Example 1.—Leached 30 days in distilled water at approx. 72 degrees Fahrenheit:
Flame test—
 Average weight loss, gram _____ 9.1
 Average char area, square inch _____ 13.8
 Average char volume, cubic inch _____ 1.76

It is seen that the paints of this invention retained their fire retardancy after prolonged periods of exposure to water.

EXAMPLE 18.—PREPARATION OF $C_{10}Cl_{10}O$-HYDRATE

To a flask containing 365 milliliters of water was added 203.5 grams of $C_{10}Cl_{10}O$ with the water content of 0.96 percent. The mixture was stirred for 8 hours at room temperature, filtered and then was air dried until a water content of approximately 9.27 percent was obtained. The hydrate was then ready for use in various paint formulations.

EXAMPLE 19.—PREPARATION OF $C_{10}Cl_{10}OH$ TRIETHANOLAMINE SALT

A hydrate of Example 18 (1,081.8 grams) was dissolved in acetone and brought to reflux temperature (approx. 62° C.). While this temperature was maintained 298.4 grams of triethanolamine was gradually added over a three hour period and thereafter the refluxing was continued for an additional 8 hours. Refluxing was discontinued, the solution was gradually cooled to room temperature and the triethanolamine salt was allowed to precipitate at the bottom of the vessel. The salt was then filtered out by conventional means. It was of light tan color, melted at 141–144 degrees centigrade and was obtained in a yield of 57.5%.

EXAMPLE 20.—PREPARATION OF $C_{10}Cl_{10}OH$ ETHYLENE GLYCOL DERIVATIVE

There were charged 49.1 grams of $C_{10}Cl_{10}O$, 6.2 grams of ethylene glycol and 50 milliliters of carbon tetrachloride into a three-mouthed 500 milliliter flask. The mixture was brought to reflux temperature and maintained at reflux temperature for approximately 8 hours, and was constantly agitated during the period of refluxing. Upon standing at room temperature, white crystals appeared. This solid matter melted at over 300 degrees centigrade. It was redissolved in carbon tetrachloride, cooled to room temperature, filtered and air dried. Fine powdery white crystals were obtained.

EXAMPLE 21.—PREPARATION OF $C_{10}Cl_{10}OH$ ETHYLENE DIAMINE DERIVATIVE

There were dissolved 300 grams of $C_{10}Cl_{10}O$ in 305 milliliters of methanol. Then 38 milliliters of water were added, with stirring. Thereafter 100 grams of ethylene diamine was added with stirring. A light precipitate was formed as the temperature was raised to about 45 degrees centigrade and thereafter the mixture was boiled for about 10 minutes. After cooling to room temperature the white precipitate was recovered by filtering. Thereafter the precipitate was washed with successive portions of methanol and was air dried at room temperature.

Paints having a latex-water vehicle system with different amounts of $C_{14}H_6Cl_{12}$ were formulated and tested for flame retardancy, as reported in Table VI. The paints were prepared by making a pigment grind in a colloid mill and the final paints were manufactured in a standard paint mixer unit. The paints were suitable for interior use.

TABLE VI.—LATEX-WATER PAINTS WITH $C_{14}H_8Cl_{12}$

| Example | 22 | 23 | 24 | 25 |
|---|---|---|---|---|
| FORMULATION | | | | |
| Pigment: | | | | |
| Titanium Dioxide | 195 | 195 | 195 | 195 |
| Calcium Carbonate | 246 | 172.2 | 147.6 | 61.5 |
| $C_{16}H_6Cl_{12}$ | none | 73.8 | 98.4 | 184.5 |
| Vehicle and Modifiers: | | | | |
| Dispersing Agent (38.5% nonvolatile) | 16.9 | 16.9 | 16.9 | 16.9 |
| Pine Oil | 0.9 | 0.9 | 0.9 | 0.9 |
| Ethylene Glycol | 17.3 | 17.3 | 17.3 | 17.3 |
| Wetting Agent (neutral ester sulfonated dicarboxylic acid) 25% solution | 1.2 | 1.2 | 1.2 | 1.2 |
| Defoamer | 6.9 | 6.9 | 6.9 | 6.9 |
| Ethylene Glycol Monobutyl Ether Acetate | 6.5 | 6.5 | 6.5 | 6.5 |
| Diethylene Glycol Monoethyl Ether | 6.5 | 6.5 | 6.5 | 6.5 |
| Hydroxyethyl Cellulose (7.5% solids) | 154.8 | 154.8 | 154.8 | 154.8 |
| Water | 236.5 | 236.5 | 236.5 | 236.5 |
| Polyvinyl Acetate-Acrylate Copolymer | a 276.0 | 294.9 | 304.7 | 335.8 |
| Total | 1,164.5 | 1,183.4 | 1,193.2 | 1,224.3 |
| Flame Test: | | | | |
| Average Weight Loss, gram | 15.4 | 11.4 | 10.2 | 9.5 |
| Average Char Area, square inch | 43.7 | 20.0 | 14.6 | 21.0 |
| Average Char Volume, cubic inch | 7.98 | 3.81 | 2.67 | 3.85 | a UCAR 180, Union Carbide Corp, New York, N.Y.

Various changes and modifications may be made and equivalents may be substituted in the method and composition of this invention, certain preferred forms of which have been herein decribed, but without departing from the scope of this invention. Such modifications are to be regarded as within the scope of this invention.

What is claimed is:

1. In a fire retardant paint comprised of a vehicle component selected from the group consisting of oil base and water base vehicles, and an inert pigment the improvement which comprises a fire retarding amount from about 20 to about 80 percent of the total pigment of a fire retarding pigment selected from the group consisting of (a) bis(pentachlorocyclopentadienyl), (b) 2,2',3,3',4,4',5,5',7,7',7,7'-dodecachloro-1,1',2,2',5,5',6,6'-octahydro-2,2',5,5'-methanobiphenyl, (c) the reaction product of bis(pentachlorocyclopentadienyl) with ethylene glycol, (d) compounds having the formula

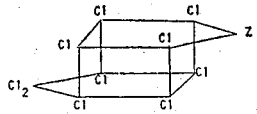

wherein Z is selected from the group consisting of $(OH)_2 \cdot xH_2O$, S, and $(OH)[O][NH(R_4)_3]^+$;

(e) 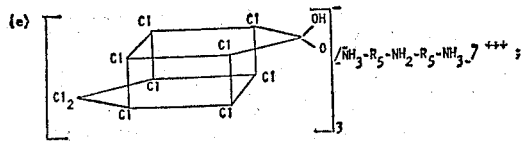

(f) 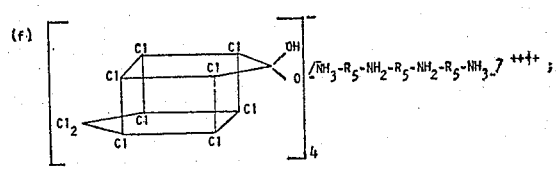

(g) 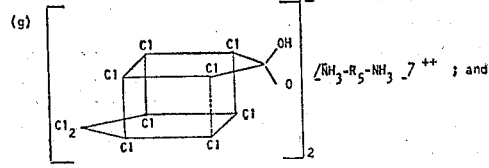 and (h) mixtures thereof, wherein $R_4$ is selected from the group consisting of hydrogen, alkyl containing from 1 to 20 carbon atoms, and monohydroxy alkyl containing from 1 to 20 carbons atoms; each $R_5$ is an alkyl having 2 to 6 carbon atoms; and $x$ is an integer from zero to 5.

2. In a fire retardant paint comprised of a vehicle component, and an inert pigment the improvement which comprises a fire retarding amount from 20 to about 80 percent of the total pigment of a fire retarding pigment, said fire retarding pigment being 2,2',3,3',4,4',5,5',7,7,7'7'-dodecachloro-1,1',2,2',5,5',6,6' - octahydro - 2,2',5,5'-methanobiphenyl.

3. In a fire retardant paint comprised of a vehicle component, and an inert pigment the improvement which comprises a fire retarding amount from 20 to about 80 percent of the total pigment of a fire retardant pigment, said fire retarding pigment being bis(pentachlorocyclopentadienyl).

4. In a fire retardant paint comprised of a vehicle component, and an inert pigment the improvement which comprises a fire retarding amount from 20 to about 80 percent of the total pigment of a fire retardant pigment, said fire retarding pigment having the formula

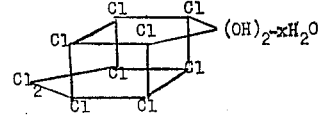

wherein $x$ is an integer from zero to 5.

5. In a fire retardant paint comprised of a vehicle component, and an inert pigment the improvement which comprises a fire retarding amount from 20 to about 80 percent of the total pigment of a fire retarding pigment, said fire retarding pigment having the formula

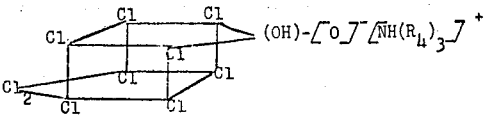

wherein each $R_4$ is independently selected from the group consisting of hydrogen, alkyl and monohydroxyalkyl.

6. In a fire retardant paint comprised of a vehicle component, and an inert pigment the improvement which comprises a fire retarding amount from 20 to about 80 percent of the total pigment of a fire retardant pigment, said fire retardant pigment having the formula

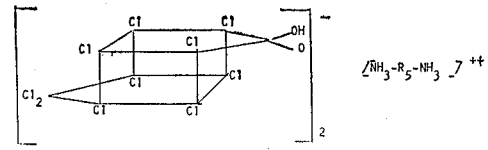

wherein $R_5$ is an alkyl having 2 to 6 carbon atoms.

7. A fire retardant article comprised of an article having a surface coated with a water base or oil base paint containing a fire retarding amount from about 20 to about 80 percent of the total pigment of a fire retardant pigment selected from the group consisting of
   (a) bis(pentachlorocyclopentadienyl)
   (b) 2,2',3,3',4,4',5,5',7,7,7',7'-dodecachloro - 1,1',2,2', 5,5',6,6'-octahydro-2,2',5,5'-methanobiphenyl,
   (c) the reaction product of bis(pentachlorocyclopentadienyl) with ethylene glycol, (d) compounds having the formula

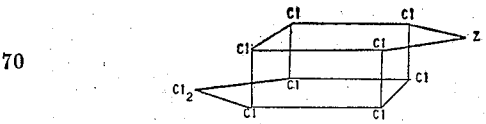

wherein Z is selected from the group consisting of $(OH)_2$—$xH_2O$, S, and $(OH)[O]^-[NH(R_4)_3]^+$;

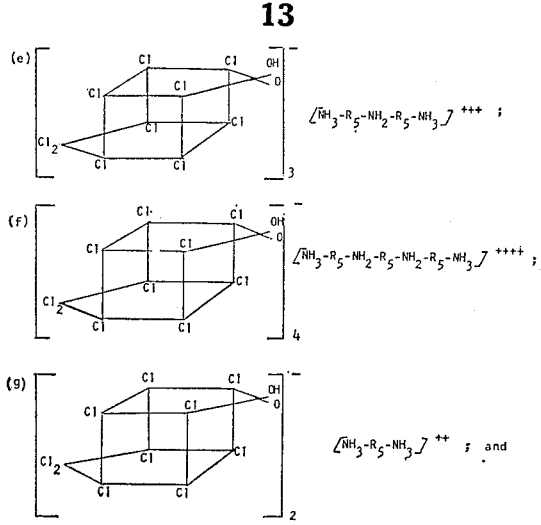

(h) mixtures thereof, wherein carbon atoms, substituted alkyl containing from 1 to 20 carbon atoms in which the substituents are selected from the group consisting of halogen, alkyl, alkoxy, aryloxy, furyl, tetrahydrofuryl, alkylmercapto, arylmercapto and alkenyl groups, aryl containing from 6 to 18 carbon atoms, substituted aryl containing from 6 to 18 carbon atoms in which the substituents are selected from the group consisting of halogen, alkyl, alkoxy, aryloxy, furyl, tetrahydrofuryl, alkylmercapto, arylmercapto and alkenyl groups, amino, substituted amino selected from the group consisting of alkylamines, alkanolamines, alkylenediamines, dialkylenetriamines, tetraalkylenepentamines, hexamethylenetetramine, morpholine, pyridine and aminophenylamines, alkoxy containing from 1 to 20 carbon atoms and aryloxy containing from 6 to 18 carbon atoms; Y is selected from the group consisting of S and O, $R_2$ and $R_3$ are selected from the group consisting of H, alkyl containing from 1 to 20 carbon atoms, substituted alkyl containing from 1 to 20 carbon atoms in which the substituents are selected from the group consisting of halogen, alkyl, aryloxy, furyl, tetrahydrofuryl, alkylmercapto, arylmercapto and alkenyl groups; aryl containing from 6 to 18 carbon atoms, substituted aryl containing from 6 to 18 carbon atoms in which the substituents are selected from the group consisting of halogen, alkyl, alkoxy, aryloxy, furyl, tetrahydrofuryl, alkylmercapto, arylmercapto and alkenyl groups; $R_2$ and $R_3$ when conjoined are selected from the group consisting of alkylene containing from 1 to 20 carbon atoms, substituted alkylene containing from 1 to 20 carbon atoms in which the substituents are selected from the group consisting of halogen, alkyl, nitro, alkoxy, aryloxy, furyl, tetrahydrofuryl, alkylmercapto, arylmercapto and alkenyl groups; phenylene and substituted phenylene in which the substituents are selected from the group consisting of halogen, alkyl containing from 1 to 20 carbon atoms, nitro, alkoxy containing from 1 to 20 carbon atoms, aryloxy containing each $R_4$ is independently selected from the group consisting of hydrogen, alkyl containing from 1 to 20 carbon atoms and monohydroxy alkyl containing from 1 to 20 carbon atoms, $R_5$ is alkyl having from 2 to 6 carbon atoms, and $x$ is an integer from zero to 5.

8. A fire retardant article comprised of an article having a surface coated with a paint containing a fire retarding amount from about 20 to about 80 percent of the total pigment of a fire retardant pigment, said fire retarding pigment being 2,2',3,3',4,4',5,5',7,7,7',7' - dodecachloro-1,1',2,2',5,5',6,6'-octahydro-2,2',5,5'-methanobiphenyl.

9. A fire retardant article comprised of an article having a surface coated with a paint containing a fire retarding amount from about 20 to about 80 percent of the total pigment of a fire retardant pigment, said fire retarding pigment being bis(pentachlorocyclopentadienyl).

10. A fire retardant article comprised of an article having a surface coated with a paint containing a fire retarding amount from about 20 to about 80 percent of the total pigment of a fire retardant pigment, said fire retarding pigment having the formula

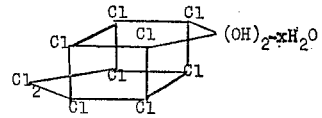

wherein x is an integer from zero to 5.

11. A fire retardant article comprised of an article having a surface coated with a paint containing a fire retarding amount from about 20 to about 80 percent of the total pigment of a fire retardant pigment, said fire retardant pigment having the formula

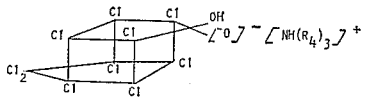

wherein each $R_4$ is independently selected from the group consisting of hydrogen, alkyl and monohydroxyalkyl.

12. A fire retardant article comprised of an article having a surface coated with a paint containing a fire retarding amount from about 20 to about 80 percent of the total pigment of a fire retardant pigment, and fire retarding pigment having the formula

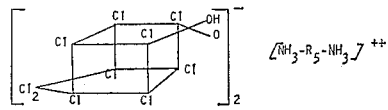

wherein $R_5$ is an alkyl having 2 to 6 carbon atoms.

References Cited
UNITED STATES PATENTS 3,151,992 10/1964 Blair et al.
3,202,692 8/1965 Weil et al.

ALEXANDER H. BRODMERKEL, *Primary Examiner.*

L. B. HAYES, *Assistant Examiner.*

UNITED STATES PATENT OFFICE
CERTIFICATE OF CORRECTION

Patent No. 3,347,684                                        October 17, 1967

Noel D. Blair et al.

It is hereby certified that error appears in the above numbered patent requiring correction and that the said Letters Patent should read as corrected below.

Column 1, line 48, "film" should read -- films --. Column 2, after line 45, insert -- wherein Z is selected from the group consisting of $(OH)_2 \cdot xH_2O$, S, --. Column 6, line 38, "point" should read -- paint --. Column 7, line 34, "adidtional" should read -- additional --; line 60, "Uusing" should read -- Using --. Column 9, line 7, "360" should read -- 260 --. Column 11, line 8, "$C_{16}H_6Cl_{12}$" should read -- $C_{14}H_6Cl_{12}$ --. Column 13, line 21, cancel "carbon atoms, substituted"; same column 13, beginning with "alkyl containing", in line 22, cancel all to and including "containing", in line 58, same column 13.

Signed and sealed this 16th day of September 1969.

(SEAL)
Attest:

EDWARD M. FLETCHER, JR.                    WILLIAM E. SCHUYLER, JR.
Attesting Officer                                  Commissioner of Patents